United States Patent [19]
Apple, Sr.

[11] 3,884,588
[45] May 20, 1975

[54] TUBE JOINING SYSTEM

[75] Inventor: Charles N. Apple, Sr., Greensboro, N.C.

[73] Assignee: Metafab Industries, Inc., Greensboro, N.C.

[22] Filed: Oct. 5, 1972

[21] Appl. No.: 295,182

Related U.S. Application Data

[63] Continuation-in-part of Ser. No. 132,362, April 8, 1971, abandoned.

[52] U.S. Cl. ............... 403/194; 403/231; 403/242; 403/256
[51] Int. Cl. .............................................. F16b 9/00
[58] Field of Search .......... 403/167, 168, 187, 188, 403/192, 193, 194, 231, 242, 256, 257, 277, 280, 292, 297; 52/758 C; 211/145, 177

[56] References Cited
UNITED STATES PATENTS

| 1,540,408 | 6/1925 | Lonn | 403/193 |
| 1,630,338 | 5/1927 | Gail | 403/274 X |
| 2,972,495 | 2/1961 | Yalen | 403/297 X |
| 3,244,406 | 4/1966 | Garofola | 256/21 |
| 3,353,853 | 11/1967 | Heywood | 287/54 |
| 3,480,155 | 11/1969 | Ferdinand et al. | 211/148 |
| 3,552,783 | 1/1971 | Tavano | 403/189 |
| 3,556,569 | 1/1971 | Bruhn | 403/192 |

Primary Examiner—Werner H. Schroeder

[57] ABSTRACT

A system for joining tubing in an angular relationship by forming openings in a first tube member while providing a stem member with legs or tabs adapted to be inserted within the openings. The two units are swaged together by a tool which is forced through the first tubular member thus deforming the legs to provide a rigid unit. A second tubular member is releasably coupled to the stem member, in abutting relation with the first tube member, by fasteners.

8 Claims, 20 Drawing Figures

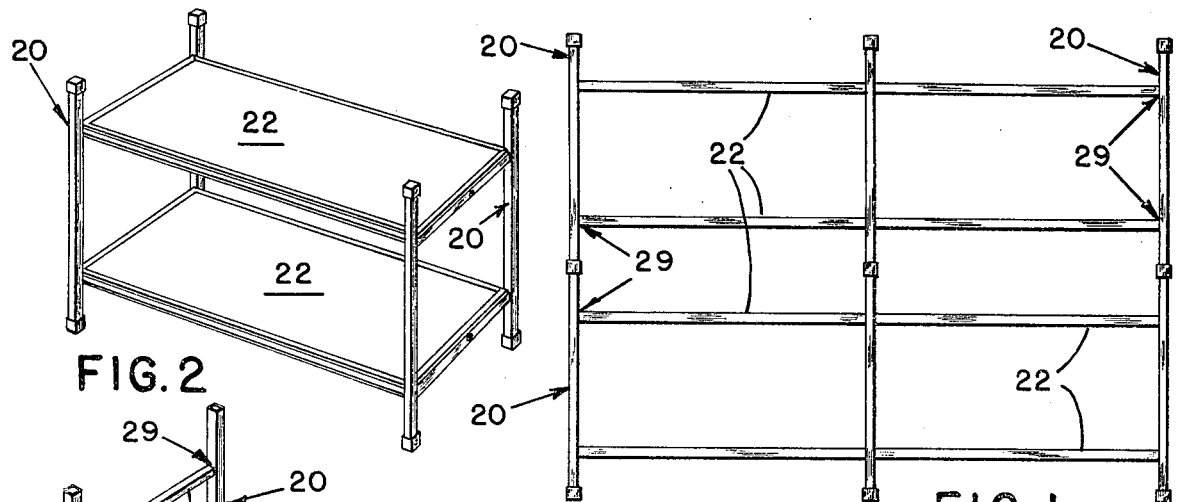
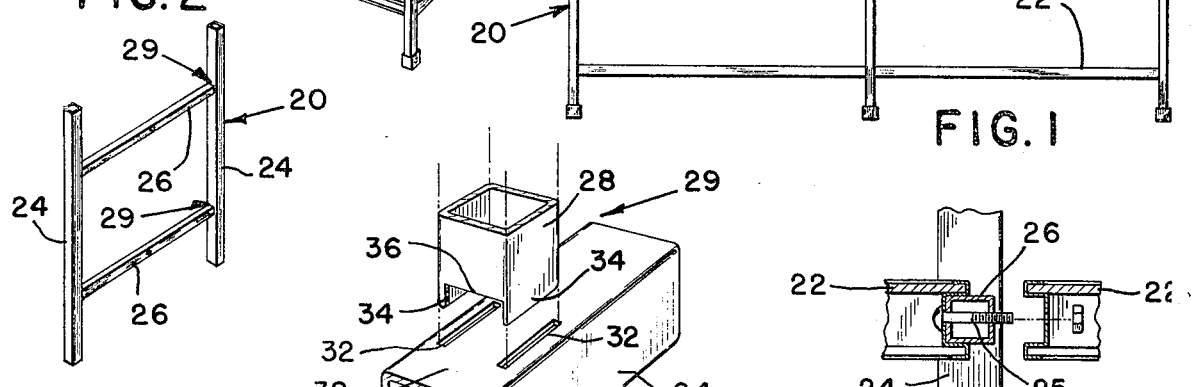
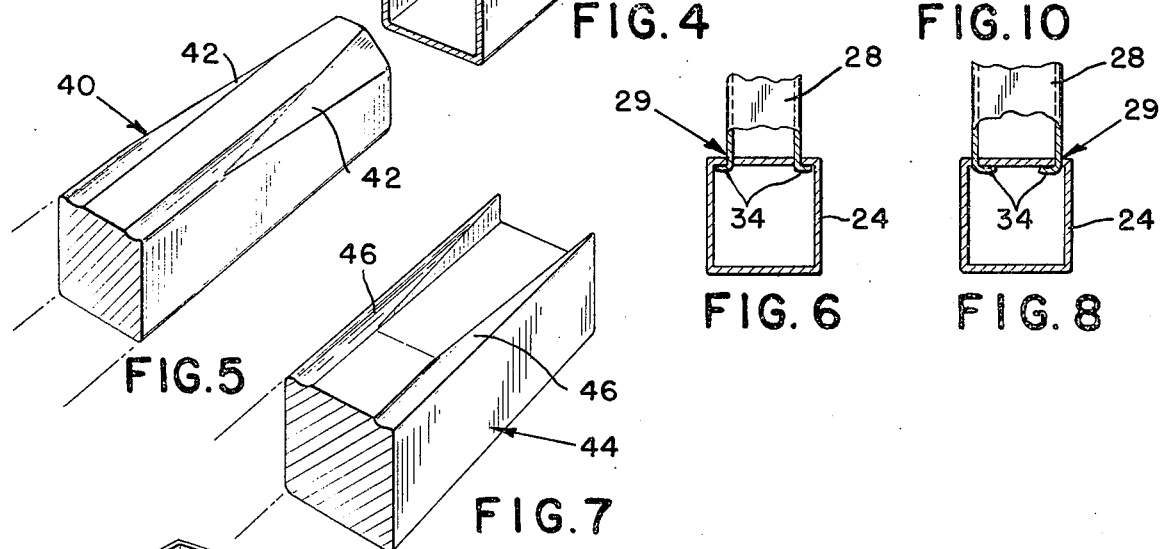
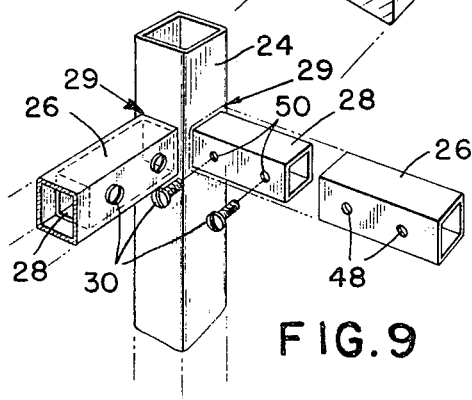
INVENTOR
CHARLES N. APPLE SR.

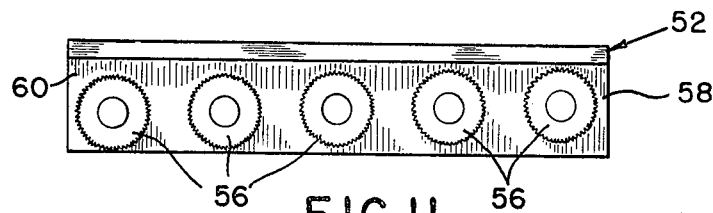
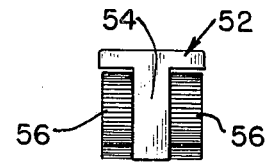
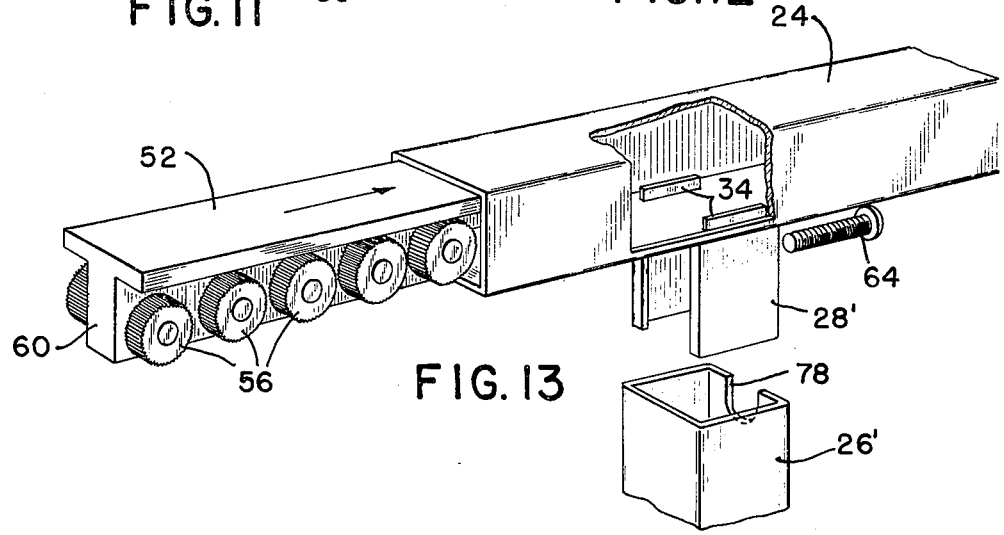
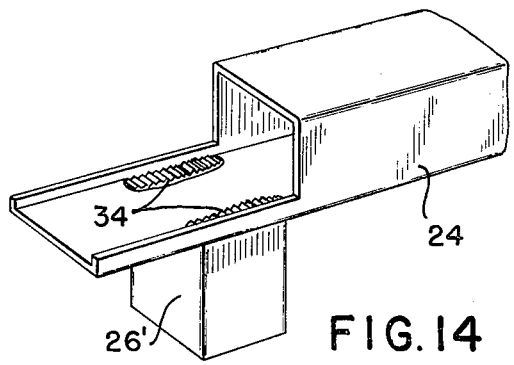
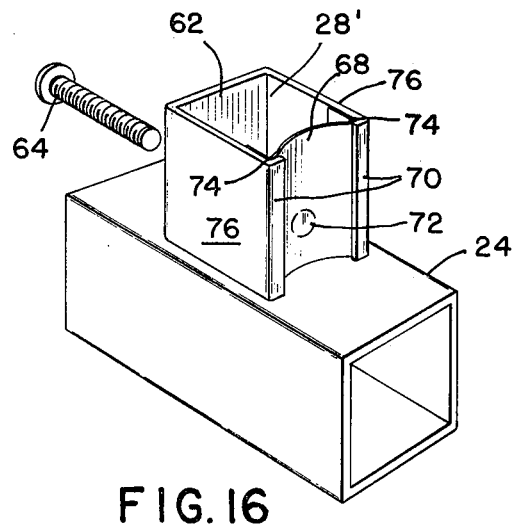
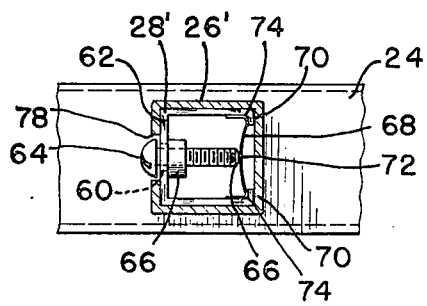
INVENTOR
CHARLES N. APPLE SR.

TUBE JOINING SYSTEM

BACKGROUND, BRIEF SUMMARY, AND OBJECTS OF THE INVENTION

This application is a continuation-in-part of application Ser. No. 132,362 filed Apr. 8 1971, now abandoned.

The present invention relates to a joint for tubular members and to a method for joining tubing and more particularly to a system for joining tubing, preferably square or rectangular tubing, in an angular relationship.

Heretofore in the manufacture of units such as tables, bookshelves, displays, etc., utilizing tubing, it has been the conventional practice to secure the tube members by welding. However, difficulty has been encountered in suitably finishing the welded joints. In addition, where the tube members are welded together, it has been necessary to polish and plate or paint the members after construction of the members into a unit. Consequently, it is difficult and time consuming to polish the welds and plate the tube members after forming the members into a unit.

The present invention eliminates such difficulties since various units can be assembled utilizing the tube joining system without damage to the surface finish of the tubular members. The tubular members may be painted or plated before being assembled into tables, shelves, etc.

Briefly, the tube joining system of this invention permits tubes to be angularly disposed relative to each other in a rigid manner without welding, brasing or soldering of the members. Preferably a first tubular member has spaced openings formed therein by punching or other suitable means while a stem member, which also may be of tubular construction has legs spaced thereon to conform to and be received within the tubular member openings. Thereafter, a wedgeshaped or other suitable tool may be forced through the first tubular member for deforming the legs and rigidly securing the first tubular member and the stem member in assembled relation. A second tubular member is slipped over the stem member and secured thereto by suitable fastening means which may include a spring member.

One of the primary objects of the invention is the provision of a novel joint and a method for rigidly joining tubes in an angular relationship.

Another object of the invention is the provision of a system for joining tubular members without welding.

Still another object of the invention is the provision of a tubular joint that can be readily and economically produced.

Other objects and advantages of the invention will become apparent when considered in view of the following detailed description.

BRIEF DESCRIPTION OF THE FIGURES

FIG. 1 is a front elevational view of a shelving unit constructed of tubing in accordance with the principles of the present invention;

FIG. 2 is a perspective view of another unit constructed in accordance with the principles of the invention;

FIG. 3 is a perspective view of a frame unit having tubing sections joined in accordance with the invention;

FIG. 4 is a fragmentary, perspective view illustrating the manner of inserting a stem member into a square tubing member for subsequent securement thereto;

FIG. 5 is a perspective view of one embodiment of a wedge-shaped tool for deforming the legs of the stem member;

FIG. 6 is a cross-sectional view of the tube member and stem member after deforming the legs of the stem member outwardly by the tool of FIG. 5;

FIG. 7 is a perspective view of another embodiment of a tool for deforming the legs of a stem member;

FIG. 8 is a cross-sectional view of a tube member and a stem member after deforming the legs inwardly with the tool of FIG. 7;

FIG. 9 is a perspective view illustrating the manner of securing the second tube member, by a releasable fastener, to the stem members fixedly secured to the first tubular member;

FIG. 10 illustrates a cross-sectional view of a means for securing adjacent shelves to a tubular member for forming a shelf unit;

FIG. 11 is a side elevational view of still another embodiment of a tool for deforming the stem member legs;

FIG. 12 is an end elevational view of the tool of FIG. 11;

FIG. 13 is a fragmentary, perspective view, with portions removed, of tubular members adapted to be coupled by the stem member upon displacement of a tool and actuation of the releasable fastener;

FIG. 14 is a fragmentary, perspective view of joined tube members, with parts removed, after deforming of the stem legs;

FIG. 15 is a bottom plan view of the joined tube members and stem member of FIG. 14 and illustrating one means for releasably fastening the stem member to a second tube member of FIG. 14;

FIG. 16 is a fragmentary, perspective view of a tube member having a stem member secured thereto, and further illustrating the releasable means of FIG. 15 for fastening the stem member to a second tube member;

DETAILED DESCRIPTION OF THE INVENTION

Figure 17:
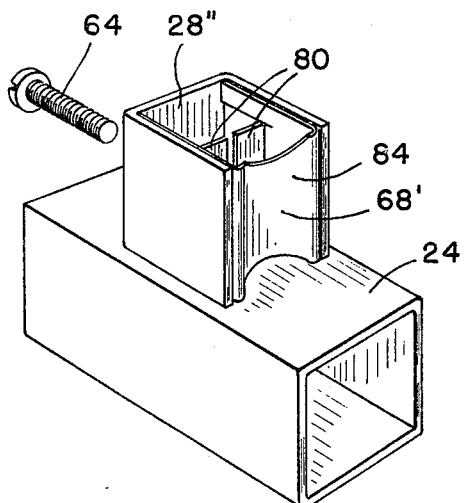
FIG. 17 is a fragmentary perspective view of a modified releasable fastener means for securing together two tubular members.

Referring to the drawing and particularly to FIGS. 1–3, reference numeral 20 designates frame members constructed in accordance with the tube joining system of the present invention and interconnected by shelves 22 to form various articles or units such as tables, shelving units, etc. Adjacent shelves 22 may be fastened to the opposite sides of a tubular member 26 by means of suitable fasteners such as bolts 25.

Preferably tube members 24 and 26 are joined together through a stem member 28 and fasteners such as screws 30 to form a rigid structure. At each joint 29 the tubular members 24 are provided with spaced, parallel slots or openings 32 which are adapted to receive the spaced legs 34 of stem members 28. The slots 32 may be provided within the members 24 as by punching or other suitable means, while the legs 34 are formed by cutting away portions of the end of a stem member. After inserting the stem member legs 34 into the tubular member slots 32, the legs are deformed to fasten the members together.

Referring to FIGS. 4-8, the stem member end portions 36 abut the tubular member 24 intermediate the slots 32 at 38. A wedge-shaped tool 40 may be forced through the tube member 24 for bending the leg members 34. In addition to merely bending the leg members, such action also pulls the stem member surfaces 36 into tight abutting relation with surfaces 38. The tool 40, which may be forced through the tubular member 24, by a ram or other suitable means, has tapered, inclined cam surfaces 42 which gradually force the legs 34 into the position of FIG. 6 as the tool 40 is forced therethrough.

FIG. 7 shows a modified embodiment of a tool 44 having spaced cam surfaces 46 provided on the upper edges thereof for bending the legs 34 of stem member 28.

The configurations of the cam surfaces are such that the legs 34 are bent inwardly, as illustrated by FIG. 8, for firmly and rigidly clamping the stem member 28 to the tubular member 24.

FIG. 9 illustrates a tubular member 24, forming a corner post, having two stem members 28 secured thereto by swaging by utilizing either the tool 40 of FIG. 5 or the tool 44 of FIG. 7. Tubular members 26, which preferably interconnect stem members 28, have openings 48 therein for receiving screws 30. The screws 30 are threadably received within openings 50 in a stem member 28, after passing through openings 48 for fastening a tubular member 26 to a stem member 28.

FIGS. 11-16 relate to a modified embodiment of a tool for deforming legs 34 of a stem member and a modified embodiment of a means for attaching the stem member to a tubular member.

The modified tool 52 comprises a generally T-shaped member 54 having a series of rollers 56 spaced on each side thereof. On each side of the tool, the rollers 56 are gradually, subsequently lowered, with respect to the bottom of the T-shaped member 54, from the forward end 58 to the rearward portion 60 of the tool. In a preferred embodiment of the invention, five rollers are located on each side of the tool with each succeeding roller being mounted approximately 0.020 inches below the preceding roller. The rollers 56 are of tool steel having knurls of 20 pitch. The tool may be attached to and forced through a tubular member 24 by a ram, not shown.

A stem member 28' having legs 34 thereon is positioned in abutting relationship with a tubular member 24 with the legs 34 extending through spaced slots in a manner as previously described. However, the stem member 28' is generally U-shaped rather than being square or rectangular as disclosed in FIGS. 4 and 9. As the tool 52 is forced through the tubular member 24, the rollers 56 engage the legs 34 to tighten the stem members 28' with respect to member 24 by deforming and compressing the legs within the slots of tubular member 24 in a manner as shown by FIG. 14. The first rollers 56 to engage the legs 34 partially deform or compress the legs and since the positions of the subsequent rollers with respect to the bottom of the T-shaped member 52 are gradually lowered, each roller further compresses the legs. The stem member 28' is provided with an opening 60 in the base portion 62 for receiving a fastener 64. A member 66 is fixed to the inner side of the base portion 62 for threadably receiving the screw 64. The end 66 of the screw acts against a U-shaped spring member 68 which is retained within the open end of the U-shaped stem 28' by inwardly directed legs 70. The base 72 of the spring 68 is bowed inwardly, as shown by FIGS. 15 and 16, such that rotation of the screw 64 in the proper direction forces the ends 74 of the spring outwardly urging the legs 76 of stem member 28' outwardly.

A tubular member 26', having a notch 78 therein, for receiving the head of screw 64, is adapted to be positioned over the extended end of the stem member 28'. Rotation of screw 64 expands the ends of legs 76 thus gripping the inner periphery of tubular member 26'.

Figure 18:
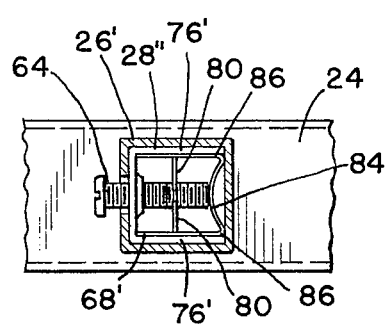
FIG. 18 is a fragmentary plan view illustrating the modified releasable fastener means for securing a second tubular member to the stem member, the stem member also being secured to a first tubular member.
Figure 20:
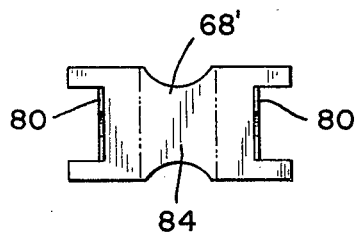
FIG. 20 is a top plan view of the spring member of the fastener means before being bent into a generally U-shaped configuration.
Figure 19:
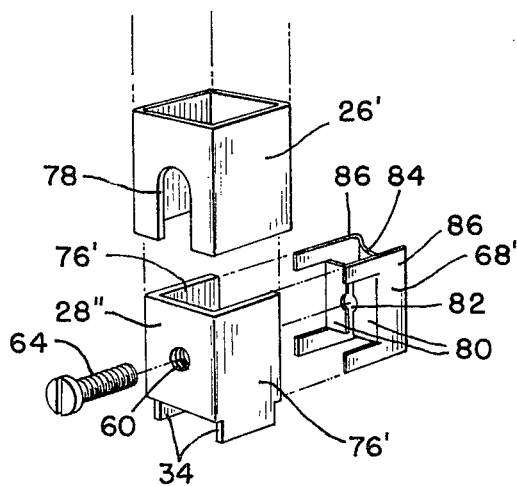
FIG. 19 is an exploded perspective view of the modified releasable fastener means illustrating the relationship of the stem member and the spring member with a tubular member.

FIGS. 17-20 illustrate a modified embodiment of the fastening means for securing a stem member to the tubular member 26'.

The embodiment illustrates a stem member 28'', which is somewhat similar to the stem member 28' of FIGS. 13-16, a modified spring member 68', and a threaded fastener 64. The stem member 28'' includes legs 34 which may be inserted within a tubular member and deformed as taught, for example, by FIGS. 6, 8 and 14 for rigid securement to the tubular member 24. Also, it is to be noted that inwardly directed legs, such as shown at 70 on stem member 28' have been eliminated from the U-shaped stem member 28''.

The spring member 68' of FIGS. 17-20 differs from the spring member 68 in that it is provided with inwardly directed tabs 80, each tab having a portion removed therefrom for defining an opening 82 for threadably receiving the fastener 64. The tabs 80 defining opening 82 grip the fastener 64 thus preventing slidable displacement of the spring member 68' relative to the stem 28'' and tubular member 26' during assembly and disassembly of the tubular members forming the joint. The base 84 of the spring member is bowed inwardly into the stem member 28'', as shown most clearly by FIG. 18, and upon proper rotation of screw 64, the screw engages the bowed spring base 84 and forces the legs 86 outwardly into engagement with the stem member legs 76' which frictionally clamp the tubular member 26', and/or the screw 64 rotation displaces the spring member 68' within the stem member 28'' such that the spring member portions adjacent the junctures of the legs 86 with the base 84 frictionally engage the inner portions of tubular member 26' to form a tight, rigid connection between tubular members 24 and 26'.

It is to be understood that the tubular members 24 and 26 of the embodiment illustrated in FIG. 9 may be secured together by stem members of the type illustrated by FIGS. 13, 15 and 16, or FIGS. 17-20.

In the forming of a joint, a first tubular member 24 has spaced openings 32 provided therein for receiving the legs 34 of a stem member 28, 28' or 28''. Thereafter, a tool, as disclosed by FIGS. 5, 7 or 11 may be forced through the tubular member 24 to deform the legs 34 as shown by FIGS. 6, 8 or 14. A second tubular member 26 or 26' then is placed over the stem member and rigidly fastened thereto by fastener means 30, fastener means 64, 68 or fastener means 64, 68'.

I claim:

1. A joint formed from a pair of members wherein the longitudinal axes of the members are out of alignment comprising; a first elongated tubular member having an exterior surface with at least one opening provided therein, a stem member rigidly secured to said first tubular member, said stem member having a portion extending through said opening and deformed and compressed therein and in firm engagement with the inner portion of said first tubular member for firm and rigid attachment thereto, a second tubular member substantially encompassing said stem member and having an end portion in abutting relation with said first tubular member, said stem member having an expansible, flexible, and slidably releasable fastening means cooperatively retained therewith, and means connected to said stem member for urging said fastener means and said stem member into frictional gripping relation with the inner periphery of said second tubular member.

2. A joint as defined in claim 1, said releasable fastener means including a spring member for urging said stem member into frictional gripping engagement with said second tubular member.

3. A joint as defined in claim 1, wherein said stem member is generally U-shaped having a base section and opposed leg sections, said fastener means including a spring member and a means for applying a force to said spring member to urge the opposed leg sections of said stem member into engagement with said second tubular member.

4. A joint as defined in claim 3, wherein said spring member is generally U-shaped having a bowed base section and substantially parallel leg sections, said spring member leg sections being substantially parallel with said stem member leg sections.

5. A joint as defined in claim 4, said spring member including means for receiving said means for applying a force to said spring member.

6. A joint as defined in claim 1, said stem member having a portion in tight abutting relation with the exterior surface of said first tubular member.

7. A joint as defined in claim 6, wherein a pair of openings are provided within said first tubular member, and said stem member portion extending through said opening including a pair of spaced legs extending through said pair of openings, said spaced legs being deformed and compressed to said pair of openings.

8. A joint formed from a pair of members wherein the longitudinal axes of the members are out of alignment comprising; a first elongated tubular member having an exterior surface with at least one pair of openings provided therein, a second member having a first end portion in tight abutting relation with the exterior surface of said first tubular member and a second end portion protruding from said first end portion comprising at least a pair of legs extending through said openings and being deformed and compressed into said openings for retaining said second member in firm and rigid attachment to said first elongated tubular member, said second member having a side with an opening therein, a releasable means cooperatively retained in said second member to be urged through said side opening, and fastening means secured to said second member to urge said releasable means into said side opening to fasten a member to be retained on said second member.

* * * * *